(No Model.)

T. SHAFFER.
ROLLING MILL.

No. 280,248. Patented June 26, 1883.

Witnesses
Harry Drury
Harry Smith

Inventor
Thomas Shaffer
by his Attorneys
Howson and Son

UNITED STATES PATENT OFFICE.

THOMAS SHAFFER, OF PHŒNIXVILLE, PENNSYLVANIA, ASSIGNOR TO THE PHŒNIX IRON COMPANY, OF SAME PLACE.

ROLLING-MILL.

SPECIFICATION forming part of Letters Patent No. 280,248, dated June 26, 1883.

Application filed May 22, 1882. Renewed March 30, 1883. (No model.)

*To all whom it may concern:*

Be it known that I, THOMAS SHAFFER, a citizen of the United States, and a resident of Phœnixville, Chester county, Pennsylvania, have invented an Improvement in Rolling-Mills, of which the following is a specification.

My invention relates to rolls for making round bar-iron; and it consists of rolls having a combination of grooves, which present passes of the relative form and dimensions described hereinafter, and illustrated in the accompanying drawings, for the purpose of most promptly reducing a billet into the best condition and by the fewest number of passes, for subsequent conversion by other passes, first to an oval and finally to the desired round bar.

Figure 1:
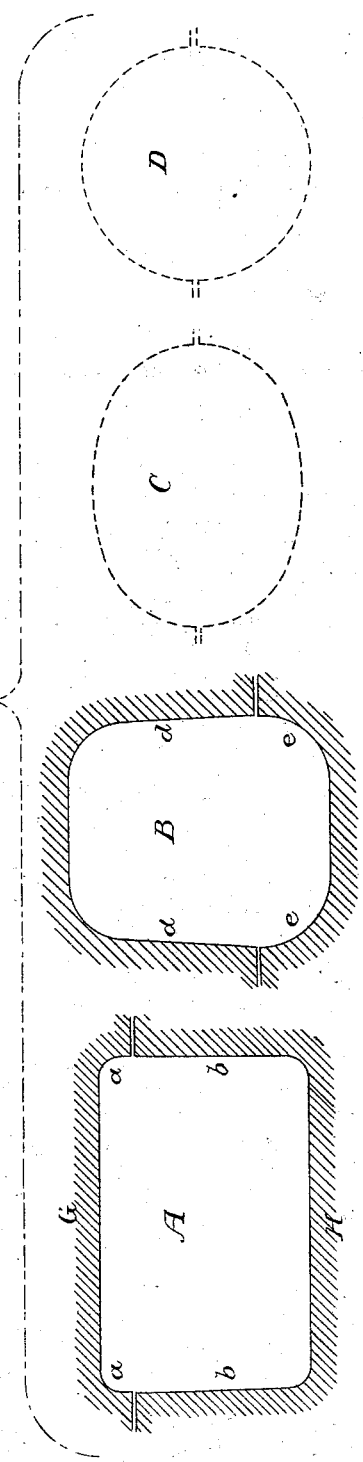
Figure 2:
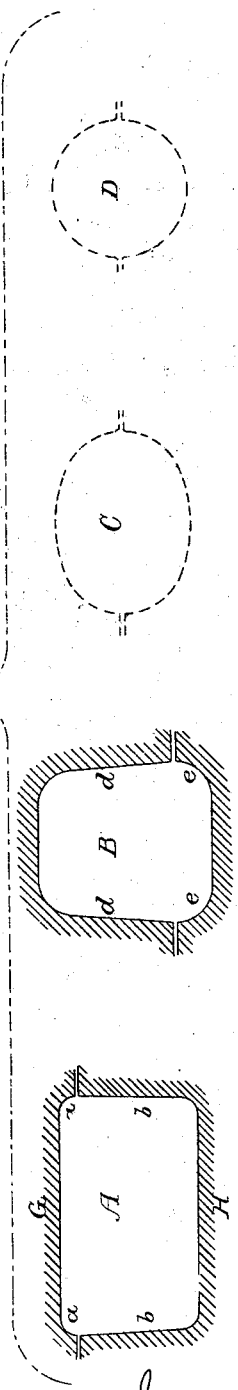

In the accompanying drawings, Figure 1 represents a series of passes in rolls for making round bar-iron, and Fig. 2 a series of analogous passes for making round bar of a smaller diameter than that shown in Fig. 1.

It should be understood in the outset that the passes C and D (shown by dotted lines) are the invention of John Griffin, assignor to the Phœnix Iron Company, and form the subject of an application for a patent made by him, my invention being restricted to the passes A and B, which are preparatory to the conversion of the bar into an oval form by the pass C, and thence into a round form by the pass D.

The pass A is formed by a shallow groove, *a*, in the roll G, and a deep groove, *b*, in the roll H, the pass being oblong, and the slight departure from a true oblong shape being due to the desirability of inclining the opposite sides of the deep groove, so that the bar may freely pass from the same as the bar leaves the rolls.

The pass B is formed by a deep groove, *d*, in one roll, and a shallow groove, *e*, in another roll, the pass being rounded at all four corners, and the departure from parallelism of the opposite sides of the grooves being caused by making the said sides inclined, as shown, for the reason above given.

It will be understood that there is the usual guide opposite each pass.

It has been found in practice that the most perfect round bars can be made with the least waste by reducing the bar to the oval form (indicated by the pass G) preparatory to reducing it to a round form by the circular pass D, the two passes bearing the relation to each other, both as regards shape and proportion, substantially as shown by dotted lines in the drawings; and it has also been found in practice that the bar can be prepared for conversion to the desired oval most promptly, and with better results generally, by the passes A and B than by any other system of passes, the billet being first reduced to the shape indicated by the pass A, and then subjected, while in the position indicated by dotted lines, to the pass B, which reduces the bar to a form quadrangular in section, with rounded corners.

The relative proportions and shapes which the passes A B bear to each other and to the oval and final round pass are accurately represented in Fig. 1, and will suffice to enable those skilled in the making and use of rolling-mills to carry out my invention; but it has been deemed best to show in Fig. 2 a succession of passes for a round bar of smaller diameter than that shown in Fig. 1.

The passes A and B may be formed in the same pair of rolls, or in separate pairs of rolls.

I claim as my invention—

The combination, in rolls, of grooves *a b*, presenting a pass, A, of oblong form, with grooves *d e*, presenting a pass, B, of oblong form, with rounded corners, and bearing the relation shown to the pass A, all substantially as set forth.

In testimony whereof I have signed my name to this specification in the presence of two subscribing witnesses.

THOS. SHAFFER.

Witnesses:
WM. H. MCELROY,
D. W. BROWER.